US008300887B2

(12) United States Patent
Nishigaki et al.

(10) Patent No.: US 8,300,887 B2
(45) Date of Patent: Oct. 30, 2012

(54) OBJECT DETECTION APPARATUS, OBJECT DETECTION METHOD AND OBJECT DETECTION PROGRAM

(75) Inventors: Morimichi Nishigaki, Wako (JP); Yiannis Aloimonos, College Park, MD (US); Justin Domke, College Park, MD (US)

(73) Assignee: Honda Motor Co., Ltd., Tokyo (JP)

( * ) Notice: Subject to any disclaimer, the term of this patent is extended or adjusted under 35 U.S.C. 154(b) by 1573 days.

(21) Appl. No.: 11/801,576

(22) Filed: May 10, 2007

(65) Prior Publication Data

US 2008/0278576 A1  Nov. 13, 2008

(51) Int. Cl.
*G06K 9/00* (2006.01)
*H04N 7/18* (2006.01)

(52) U.S. Cl. .......................................... 382/103; 348/94
(58) Field of Classification Search .................. 382/103, 382/107; 348/94
See application file for complete search history.

(56) References Cited

U.S. PATENT DOCUMENTS

| | | | | |
|---|---|---|---|---|
| 5,414,474 A * | 5/1995 | Kamada et al. | ............... | 348/700 |
| 5,444,791 A * | 8/1995 | Kamada et al. | ............... | 382/190 |
| 5,991,428 A | 11/1999 | Taniguchi | | |
| 6,049,619 A * | 4/2000 | Anandan et al. | ............... | 382/107 |
| 6,704,621 B1 * | 3/2004 | Stein et al. | ......................... | 701/1 |
| 6,906,620 B2 * | 6/2005 | Nakai et al. | .................... | 340/435 |
| 7,542,834 B2 | 6/2009 | Nobori et al. | | |
| 7,684,651 B2 * | 3/2010 | Tang et al. | .................... | 382/305 |
| 7,925,441 B2 * | 4/2011 | Maemura et al. | .............. | 701/301 |
| 7,982,634 B2 * | 7/2011 | Arrighetti | ..................... | 340/937 |
| 2005/0129331 A1 | 6/2005 | Kakiuchi et al. | | |
| 2008/0199050 A1 * | 8/2008 | Koitabashi | ..................... | 382/107 |
| 2008/0304705 A1 * | 12/2008 | Pomerleau et al. | ........... | 382/103 |
| 2009/0169052 A1 * | 7/2009 | Seki et al. | ...................... | 382/103 |

FOREIGN PATENT DOCUMENTS

| | | |
|---|---|---|
| JP | 10-091795 A | 4/1998 |
| JP | 2004-056763 | 2/2004 |
| JP | 2005-158033 A | 6/2005 |
| JP | 2006-202049 A | 8/2006 |
| JP | 2006-337075 A | 12/2006 |
| WO | 2005/038710 A1 | 4/2005 |

* cited by examiner

*Primary Examiner* — Aaron Strange
(74) *Attorney, Agent, or Firm* — Carrier Blackman & Associates, P.C.; Joseph P. Carrier; William D. Blackman

(57) ABSTRACT

An object detection apparatus and method for accurately detecting a movable object in a region around a vehicle from a time series of images obtained through a camera mounted on the vehicle by eliminating the influence of the movement of the camera through simple processing, and a program for making a computer execute processing in the apparatus. The object detection apparatus has a feature point extraction unit which extracts a feature point contained in a feature region of each image in the time series of images obtained through a camera mounted on the vehicle, a correspondence degree computation unit which computes the degree of correspondence for each pair of the feature points, wherein one of the feature points in the each pair is each of one or more of the feature points extracted by the feature point extraction unit from one of two images taken by the camera at different times, and another of the feature points in the each pair is each of a plurality of the feature points extracted by the feature point extraction unit from another of the two images, and a detection unit which detects the movable object on the basis of the degree of correspondence computed by the correspondence degree computation unit.

6 Claims, 4 Drawing Sheets

OBJECT DETECTION APPARATUS, OBJECT DETECTION METHOD AND OBJECT DETECTION PROGRAM

BACKGROUND OF THE INVENTION

1. Field of the Invention

The present invention relates to an object detection apparatus and method for detecting a movable object existing in a region around a vehicle from images obtained through a camera mounted on the vehicle, and an object detection program for making a computer execute processing in the object detection apparatus.

2. Description of the Related Art

In recent years, techniques to detect an object approaching a vehicle by monitoring the surroundings of the vehicle and to perform operations such as presentation of information to the driver and control of travel of the vehicle on the basis of the detection results have been proposed. As a method of detecting an object, techniques are known in which images of a region surrounding a vehicle are taken with a camera mounted on the vehicle and the taken images are processed to detect a movable object. As one of such techniques, a technique using an optical flow computed from a time series of images obtained through a single camera can be mentioned. An optical flow is a vector indicating an apparent motion on an image detected from a plurality of images taken at different times. In the case of taking images with a camera mounted on a vehicle, the camera itself moves and, therefore, an apparent motion is produced on the images by the movement of the camera. For this reason, a technique in which the amount of movement of a camera itself is estimated in detection of a movable object by using an optical flow, and the movable object is suitably detected by eliminating the influence of the movement of the camera has been proposed (see, for example, Japanese Patent Laid-Open No. 2004-56763 (hereinafter referred to as Patent Document 1)).

A monitoring apparatus for use in a vehicle disclosed in Patent Document 1 has an optical flow detection unit which obtains an optical flow from images taken with a camera, a background flow estimation unit which obtains a background flow, i.e., a camera image flow (a flow produced by the movement of the camera itself) and an approaching object detection unit which detects movement of an object existing in a region around the vehicle by comparing the optical flow and the background flow. The background flow estimation unit obtains the background flow on the basis of the movement of the vehicle estimated by a vehicle movement estimation unit and a spatial model estimated by a spatial model estimation unit (a model for the space from which images are taken by the camera).

In the apparatus disclosed in Patent Document 1, however, the vehicle movement estimation unit estimates the movement of the vehicle using the monitoring apparatus on the basis of the wheel speed, steering angle and other factors, and obtains the background flow from the movement of the vehicle. In this case, the accuracy of estimation of the background flow is reduced during high-speed travel or travel on a curve in a road due to the accuracies of sensors for detecting the vehicle speed, steering angle and other factors and the influence of deviation between the camera rotation center and the vehicle rotation center. Also, in the apparatus disclosed in Patent Document 1, there is a need to measure the distance to objects existing on the road in the forward direction from the vehicle, obtain road information from a GPS or the like and estimate a spatial model in the spatial model estimation unit using preliminary knowledge about spaces and models for roads, walls and so on in order to obtain the background flow. Complicated processing is therefore required. There is also a possibility of failure to accurately estimate the background flow. In the apparatus disclosed in Patent Document 1, the movement of an object is detected by comparing the optical flow and the background flow and there is, therefore, a possibility of occurrence of a large error resulting from erroneous estimation of the background flow and, hence, failure to suitably detect a movable object.

SUMMARY OF THE INVENTION

In view of the above-described circumstances, an object of the present invention is to provide an object detection apparatus and method capable of accurately detecting a movable object existing in a region around a vehicle from images obtained through a camera mounted on the vehicle by suitably eliminating the influence of the movement of the camera through simple processing, and an object detection program for making a computer execute processing in the object detection apparatus.

To achieve the above-described object, according to a first aspect of the present invention, there is provided an object detection apparatus which detects a movable object in a region around a vehicle from a time series of images obtained through a camera mounted on the vehicle, the apparatus having a feature point extraction unit which extracts a feature point contained in a feature region of each of the images in the time series, a correspondence degree computation unit which computes the degree of correspondence for each pair of the feature points, wherein one of the feature points in the each pair is each of one or more of the feature points extracted by the feature point extraction unit from one of two images taken by the camera at different times, and another of the feature points in the each pair is each of a plurality of the feature points extracted by the feature point extraction unit from the other of the two images, and a detection unit which detects the movable object on the basis of the degree of correspondence computed by the correspondence degree computation unit.

In the object detection apparatus according to the first aspect of the present invention, the feature point extraction unit extracts feature points contained in feature regions having, for example, characteristic shapes and colors on the image, and the correspondence degree computation unit computes the degrees of correspondence between one feature point and a plurality of features points. A movable object is detected on the basis of the degree of correspondence. Thus, detection of a movable object only from images by simpler processing can be performed in comparison with the case of explicitly obtaining the movement of a camera from the one-to-one relationship between images and a spatial model to detect the movable object. Also, the influence of an error produced in computation of the movement of the camera on the detection result is eliminated. The above-mentioned movable object is an object having a speed relative to the ground, e.g., a moving pedestrian or a vehicle other than the vehicle using the object detection apparatus. Thus, according to the first aspect of the present invention, the influence of the movement of the camera mounted on the vehicle is suitably eliminated by simple processing from the time series of images obtained through the camera to achieve accurate detection of a movable object in a region around the vehicle.

Preferably, according to a second aspect of the present invention, the object detection apparatus according to the first aspect of the present invention also includes a movement estimation unit which estimates parameters indicating the state of movement of the camera on the basis of the degree of correspondence computed by the correspondence degree computation unit, and the detection unit detects the movable object on the basis of the parameters estimated by the movement estimation unit for indicating the state of movement, and a feature value of each of the pair having the highest degree of correspondence among each of the pair composed of the feature point extracted from one of the two images and each of a plurality of the feature points extracted from the other of the two images.

In this case, the movement of the camera due to the movement of the vehicle for example appears as an apparent motion on images in the obtained time series of images. Therefore the movement of the camera can be estimated on the basis of the correspondence between images taken at different times. According to the present invention, parameters indicating the state of movement of the camera are estimated on the basis of the degrees of correspondence between one feature point and a plurality of feature points in two images taken at different times. The parameters indicating the state of movement are not values explicitly obtained for the movement of the camera but values including the translation and rotation of the camera in a mixed condition.

As a result, errors in the results of estimation of the camera movement are reduced in comparison with the case of estimating the movement of the vehicle on the basis of a one-to-one relationship and the case of explicitly obtaining the camera movement, and the estimation of the camera movement and the detection of a movable object can be performed with stability. Also, the camera movement can be estimated only from images without using sensors for detecting the movement of the vehicle and a spatial model. Thus, according to the second aspect of the present invention, the influence of the movement of the camera is suitably eliminated by simple processing to achieve accurate detection of a movable object in a region around the vehicle.

Preferably, according a third aspect of the present invention, the movement estimation unit in the object detection apparatus according to the second aspect of the present invention estimates the parameters indicating the state of movement of the camera on the basis of the degree of correspondence for each of the pair of the feature points satisfying an epipolar constraint condition. The epipolar constraint is a condition to be satisfied in the case where some of the pair of the feature points are in the background (the region other than movable objects). Changes in the images produced by the movement of the camera are evaluated by using the degree of correspondence for each of the pair of the feature points satisfying the epipolar constraint, and by assuming that the feature points are included in the background, thereby enabling the parameters indicating the movement of the camera to be suitably estimated.

Preferably, according to a fourth aspect of the present invention, the feature point extraction unit in the object detection apparatus according to the first to third aspects of the present invention extracts the feature points by using a plurality of Gabor filters having different orientations and scales, and the correspondence degree computation unit computes the degree of correspondence by using a feature value obtained by performing filtering with the plurality of Gabor filters on the feature points extracted by the feature point extraction unit. In this case, the feature points can be suitably extracted by reducing the influence of the rotation and size of the movable object on the images and other factors by the plurality of Gabor filters having different orientations and scales. The degree of correspondence is computed by using feature mounts (e.g., phase components of outputs) obtained by performing filtering with the Gabor filters on the feature points on the images. Therefore the correspondence between the feature points can be suitably computed.

Preferably, according to a fifth aspect of the present invention, the feature point extraction unit in the object detection apparatus according to the first to third aspects of the present invention extracts the feature points by using changes in colors on the images, and the correspondence degree computation unit computes the degree of correspondence by using a feature value relating to the colors of the feature points extracted by the feature point extraction unit. In this case, feature points corresponding to pedestrians or the like are ordinarily different in color on the images from the background including a road surface. Therefore the feature points can be suitably extracted by using changes in colors. Since the degree of correspondence is detected by using the feature value relating to the colors of the feature points on the images, the correspondence between the feature points can be suitably computed.

According to the present invention, there is also provided an object detection method for detecting a movable object in a region around a vehicle from a time series of images obtained through a camera mounted on the vehicle, the method including a feature point extraction step of extracting a feature point contained in a feature region of each of the images in the time series, a correspondence degree computation step of selecting each pair of the feature points, wherein one of the feature points in the each pair is each of one or more of the feature points extracted by the feature point extraction step from one of two images taken by the camera at different times, and another of the feature points in the each pair is each of a plurality of the feature points extracted by the feature point extraction step from the other of the two images, and computing a degree of correspondence for the selected each pair, and a detection step of detecting the movable object on the basis of the degree of correspondence computed in the correspondence degree computation step.

According to this object detection method, as described above with respect to the object detection apparatus in the first aspect of the present invention, an movable object is detected on the basis of the degree of correspondence and, therefore, detection of a movable object only from images by simpler processing can be performed in comparison with the case of explicitly obtaining the movement of a camera from the one-to-one relationship between images and a spatial model to detect the movable object. Also, the influence of an error produced in computation of the movement of the camera on the detection result is eliminated. Thus, according to the present invention, the influence of the movement of the camera mounted on the vehicle is suitably eliminated by simple processing from the time series of images obtained through the camera to achieve accurate detection of a movable object in a region around the vehicle.

According to the present invention, there is also provided an object detection program for making a computer execute processing for detecting a movable object in a region around a vehicle from a time series of images obtained through a camera mounted on the vehicle, the program including the functions to make the computer execute feature point extraction processing for extracting a feature point contained in a feature region of each of the images in the time series, correspondence degree computation processing for selecting each pair of the feature points, wherein one of the feature points in the each pair is each of one or more of the feature points extracted by the feature point extraction processing from one of two images taken by the camera at different times, and another of the feature points in the each pair is each of a plurality of the feature points extracted by the feature point extraction processing from the other of the two images, and for computing a degree of correspondence for the selected each pair, and a detection processing for detecting the movable object on the basis of the degree of correspondence computed by the correspondence degree computation processing.

This object detection program enables a computer to execute processing having the effects described above with respect to the object detection apparatus according to the first aspect of the present invention.

DETAILED DESCRIPTION OF THE PREFERRED EMBODIMENTS

Figure 1:
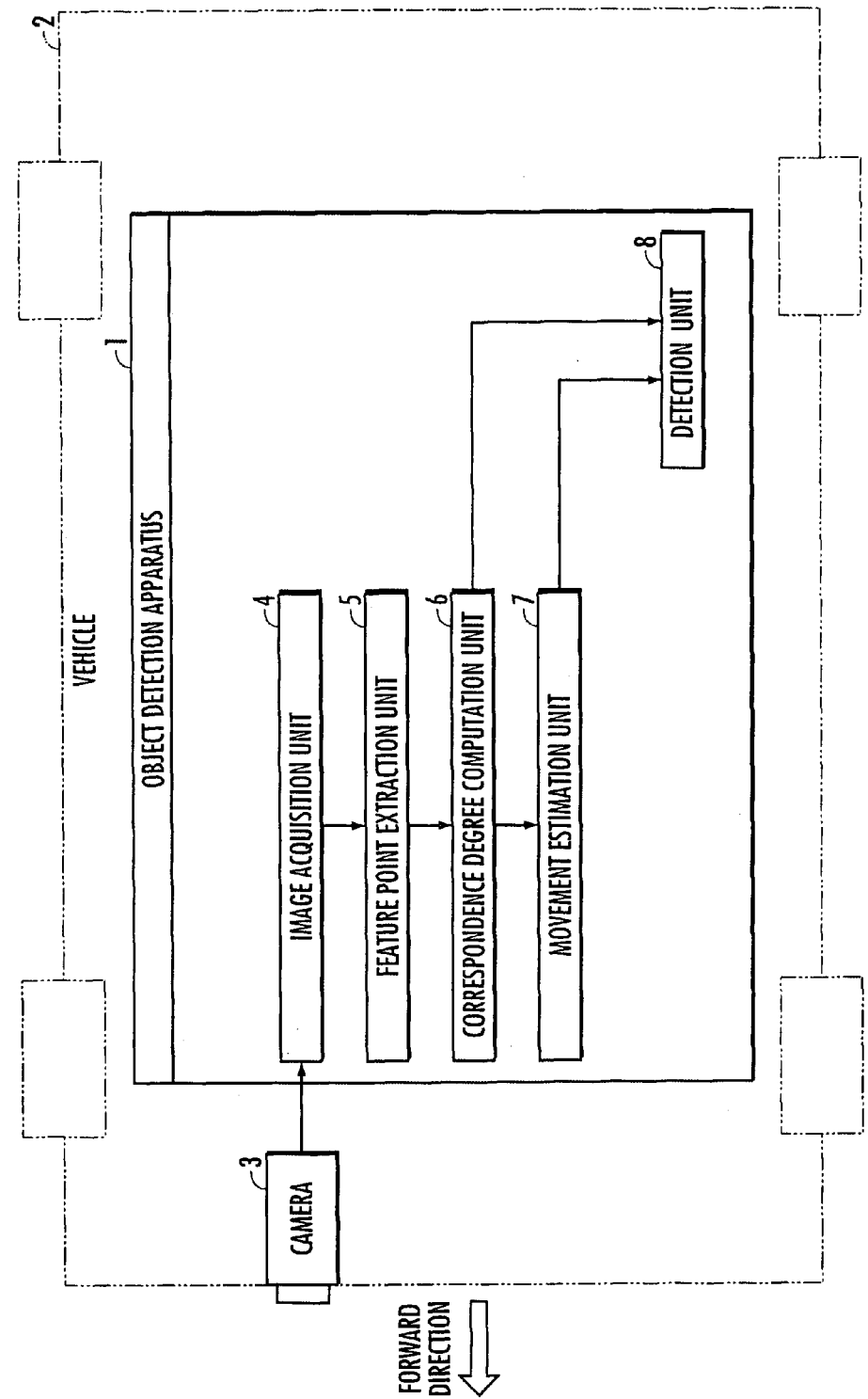
FIG. 1 is a functional block diagram of an object detection apparatus according to a first embodiment of the present invention.

As shown in FIG. 1, an object detection apparatus 1 according to an embodiment of the present invention is mounted on a vehicle 2. The object detection apparatus 1 is attached to a front portion of the vehicle 2 and connected to a camera 3 (CCD camera or the like) which takes images seen in front of the vehicle 2. The object detection apparatus 1 executes processing for detecting a movable object such as a pedestrian existing in front of the vehicle 2 from images obtained through the camera 3.

The object detection apparatus 1 is formed by an electronic unit constituted by a computer which has an A/D converter circuit for converting an input analog signal into a digital signal, an image memory for storing the digitized image signal and an interface circuit for accessing data stored in the image memory (reading or writing data), and which performs various kinds of computation processing on images stored in the image memory (a computational processing circuit including a CPU, a memory and input and output circuits, or a microcomputer having functions corresponding to those of such components). These components of the object detection apparatus 1 are not illustrated in detail. An output signal from the camera 3 is converted into a digital signal to be input to the computer.

The object detection apparatus 1 has, as functions thereof, an image acquisition unit 4 which obtains images through the camera 3, a feature point extraction unit 5 which extracts a feature point contained in a feature region of each of images in a time series, a correspondence degree computation unit 6 which computes the degree of correspondence between two images taken at different times, a movement estimation unit 7 which estimates parameters indicating the state of movement of the camera 3 on the basis of the degree of correspondence, and a detection unit 8 which detects a movable object on the basis of the degree of correspondence.

The functions of the object detection apparatus 1 are realized by executing in the object detection apparatus 1 a program loaded in the memory of the object detection apparatus 1 in advance. This program includes the object detection program in accordance with the present invention. The program may be stored in the memory via a recording medium such as a CD-ROM. The program may be stored in the memory after being distributed or broadcast via a network or an artificial satellite from an external server and received by a communication device mounted on the vehicle 2.

The image acquisition unit 4 obtains an image formed of pixel data (an image in front of the vehicle 2) through the camera 3. The output from the camera 3 (a video signal for a color image in this embodiment) is taken into the image acquisition unit 4 with a predetermined processing period. The image acquisition unit 4 performs A/D conversion of video signals (analog signals) for the pixels of the taken image input from the camera 3 and stores in the image memory (not shown) digital data obtained by the A/D conversion.

The feature point extraction unit 5 performs filtering on the image obtained by the image acquisition unit 4 by using a plurality of Gabor filters having predetermined orientations and scales to extract a feature point contained in a feature region. The feature region is a region on the image having a characteristic shape and color for example. The feature region corresponds to, for example, a movable object, such as a pedestrian or a vehicle other than the vehicle on which the object detection apparatus is provided, characteristic in terms of shape or color for example in contrast with a road surface or the sky comparatively uniform, or a region on the image corresponding to a stationary object such as a tree in a region around a road, a fence or a building. The Gabor filter is a bandpass filter having a complex-number output.

The correspondence degree computation unit 6 computes the degree of correspondence for each pair of the feature points, wherein one of the feature points in the each pair is each of one or more of the feature points extracted by the feature point extraction unit 5 from one of two images taken by the camera 3 at different times, and another of the feature points in the each pair is each of a plurality of the feature points extracted by the feature point extraction unit 5 from the other of the two images. The correspondence degree computation unit 6 computes the degree of correspondence by using as a feature value the outputs obtained by filtering with the plurality of Gabor filters having predetermined orientation and scales.

The movement estimation unit 7 estimates, on the basis of the degree of correspondence computed by the correspondence degree computation unit 6, parameters indicating the state of movement of the camera 3 due to factors including the movement of the vehicle 2. In this embodiment, the parameters indicating the state of movement are a 3×3 matrix including the translation and rotation of the camera in mixed form.

The detection unit 8 detects a movable object on the basis of the degree of correspondence computed by the correspondence degree computation unit 6. More specifically, the detection unit 8 detects a movable object on the basis of the parameters estimated by the movement estimation unit 7 for indicating the state of movement, and the feature value of each of the pair having the highest degree of correspondence among each of the pair composed of the feature point extracted from one of the two images and each of a plurality of the feature points extracted from the other of the two images.

Figure 2:
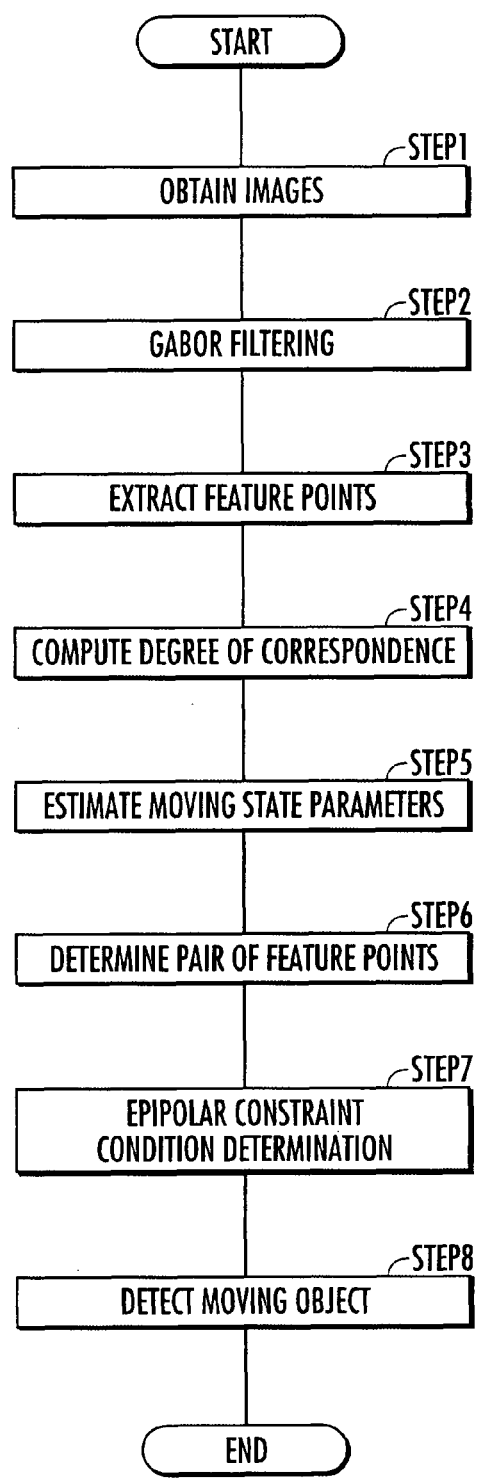
FIG. 2 is a flowchart showing object detection processing in an image processing unit of the object detection apparatus shown in FIG. 1.

The operation of the object detection apparatus (object detection processing) according to this embodiment will be described with reference to the flowchart of FIG. 2. First, in STEP 1, the object detection apparatus 1 obtains a color image signal output from the camera 3, converts the image signal from the analog form into the digital form and stores the digital image signal in the image memory.

Figure 3:
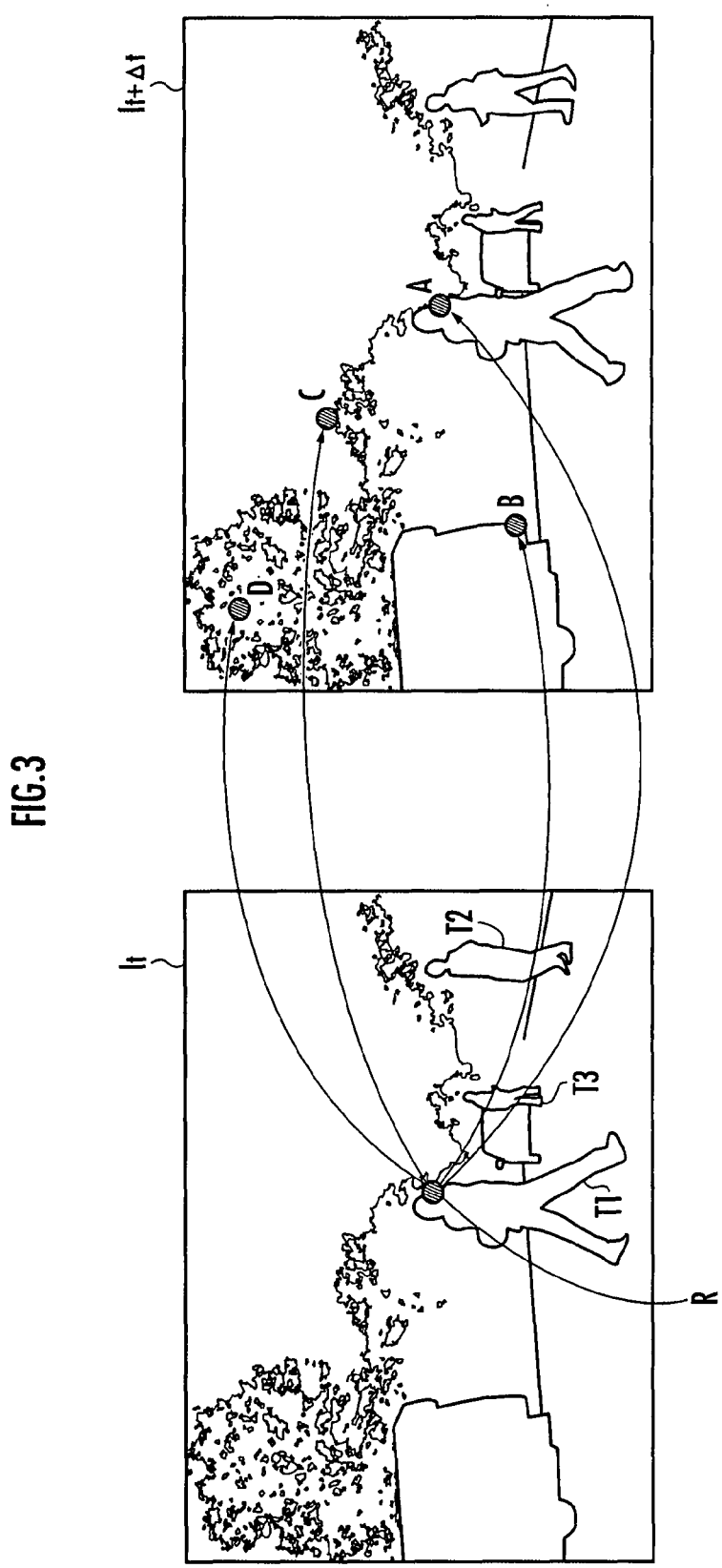
FIG. 3 is an illustration showing an example of images obtained in the object detection processing shown in FIG. 2 and processing for estimating parameters indicating the state of movement of a camera.

FIG. 3 shows a time series $I_t$, $I_{t+\Delta t}$ of images obtained through the camera 3. The image $I_t$ is an image taken at a time t, and the image $I_{t+\Delta t}$ is an image taken at a time t+Δt. In the images $I_t$ and $I_{t+\Delta t}$, pedestrians T1 to T3, which are movable objects, and trees, a building and a standing vehicle, which are stationary objects, exist in front of the vehicle 2. The pedestrians T1 to T3 are objects to be detected by the object detection apparatus 2. Description will be made of the case shown in FIG. 3 by way of example.

In STEP 2, the feature point extraction unit 5 performs filtering on the images $I_t$ and $I_{t+\Delta t}$ using a plurality of Gabor filters differing in orientation and scale with respect to each of the Gabor filters.

In STEP 3, the feature point extraction unit 5 extracts as a feature point pixels from which filtered data satisfying predetermined conditions is obtained. More specifically, the feature point extraction unit 5 obtains, for example, a vector having as its elements outputs obtained by performing filtering with the Gabor filters (a vector having the number of elements corresponding to the number of Gabor filters). The feature point extraction unit 5 sets as feature point pixels for which the obtained vector has an absolute value equal to or larger than a predetermined value.

In STEP 4, the correspondence degree computation unit 6 computes the degree of correspondence between the two images $I_t$ and $I_{t+\Delta t}$ taken at different times. More specifically, the correspondence degree computation unit 6 obtains a vector having as its elements phase components of the outputs obtained by performing filtering using the Gabor filters with respect to feature points contained in feature regions of the two images, and computes the value of correlation between the obtained two vectors as the degree of correspondence P between the feature points.

FIG. 3 shows a typical example of feature points: a feature point R on the image $I_t$, and feature points A, B, C, and D on the image $I_{t+\Delta t}$. In processing for computing the degree of correspondence P in this case, the correspondence degree computation unit 6 computes the degree of correspondence P for each pair of the feature points in the combinations between the feature point R on the image $I_t$, and the feature points A, B, C, and D on the image $I_{t+\Delta t}$. For example, the degree of correspondence P (R, A)=1 between the point R and the point A, the degree of correspondence P (R, B)=0.5 between the point R and the point B and the degree of correspondence P (R, C)=0 between the point R and the point C are obtained. The correspondence degree computation unit 6 performs this processing with respect to all the feature points on the image $I_t$. From the consideration of the amount of computation for example, processing by the correspondence degree computation unit 6 may be performed by selecting a predetermined number of feature points in the feature points extracted by the feature point extraction unit 5 and by using only the selected feature points for computation of the degree of correspondence.

In STEP 5, the movement estimation unit 7 computes parameters indicating the state of movement of the camera 3 by using the degree of correspondence computed in STEP 4. More specifically, the movement estimation unit 7 computes a 3×3 matrix E which maximizes the value of an expression (1) shown below. E represents a matrix including the translation and rotation of the camera in mixed form.

[Formula 1]

$$\sum_i \max_{\substack{j \\ p_i^T A^{-T} E A^{-1} q_j \leq k}} P(p_i, q_j) \quad (1)$$

In the above expression (1), $p_i$ represents the ith feature point on the image $I_t$ at time t; $q_j$ represents the jth feature point on the image $I_{t+\Delta t}$ at time t+Δt; A represents a 3×3 matrix including the focal length, pixel pitch and principal points of the camera in mixed form; k is a predetermined threshold value equal to or larger than 0; and $P(p_i, q_j)$ represents the degree of correspondence between $p_i$ and $q_j$. Expression (1) means adding together the maximum values of $P(p_i, q_j)$ satisfying a condition expressed by an expression (2) shown below with respect to all the feature points $p_i$ on the image $I_t$. It can be said that E that maximizes this expression (1) fits well to the change in the image. That is, if a predetermined E is given, then only $q_j$ satisfying the following expression (2):

[Formula 2]

$$p_i^T A^{-T} E A^{-1} q_j \leq k \quad (2)$$

is an object for "max" in expression (1) (an object to be computed in expression 1) with respect to predetermined $p_i$. If E is given, and if $p_i$ is assumed to be a feature point included in the background (the region other than the movable objects), there is a restriction on the location of the image at time t+Δt from the image $p_i$ at time t. The condition shown by expression (2) represents an epipolar constraint corresponding to this restriction. The value k is ideally 0 but a certain value is taken by considering an error or the like since there is the influence of the error or the like. By selecting and adding together objects $q_j$ having the maximum degree of correspondence with respect to all $p_j$, the degree of fitting of the assumed E to change in the actual image is expressed in numeric form. E that maximizes this degree of fitting is obtained to inexplicitly estimate the movement of the camera. E that maximizes this degree of fitting can be obtained in a searching manner by performing ordinary optimization processing.

In STEP 6, the detection unit 8 obtains the each of the pair of the feature points having the highest degree of correspondence among those computed by the correspondence degree computation unit 6 with respect to all the feature points on the image $I_t$.

In STEP 7, a value X shown by the following equation (3) is computed by using the feature value that the pair of the feature points obtained in STEP 6 has and the parameters E estimated in STEP 5 for indicating the state of movement.

[Formula 3]

$$X = p_i^T A^{-T} E A^{-1} q_j \quad (3)$$

That is, expression (2) is satisfied with respect to the background. Therefore a non-background portion (a movable object) is identified if expression (2) is not satisfied. The detection unit 8 then determines that the points having a value X equal to or larger than a predetermined threshold value m (m>k) belongs to movable objects. Points belonging to movable objects are thereby extracted, as indicated by white regions (other than the region indicated by a grid of dots) in FIG. 4 by way of example.

Figure 4:
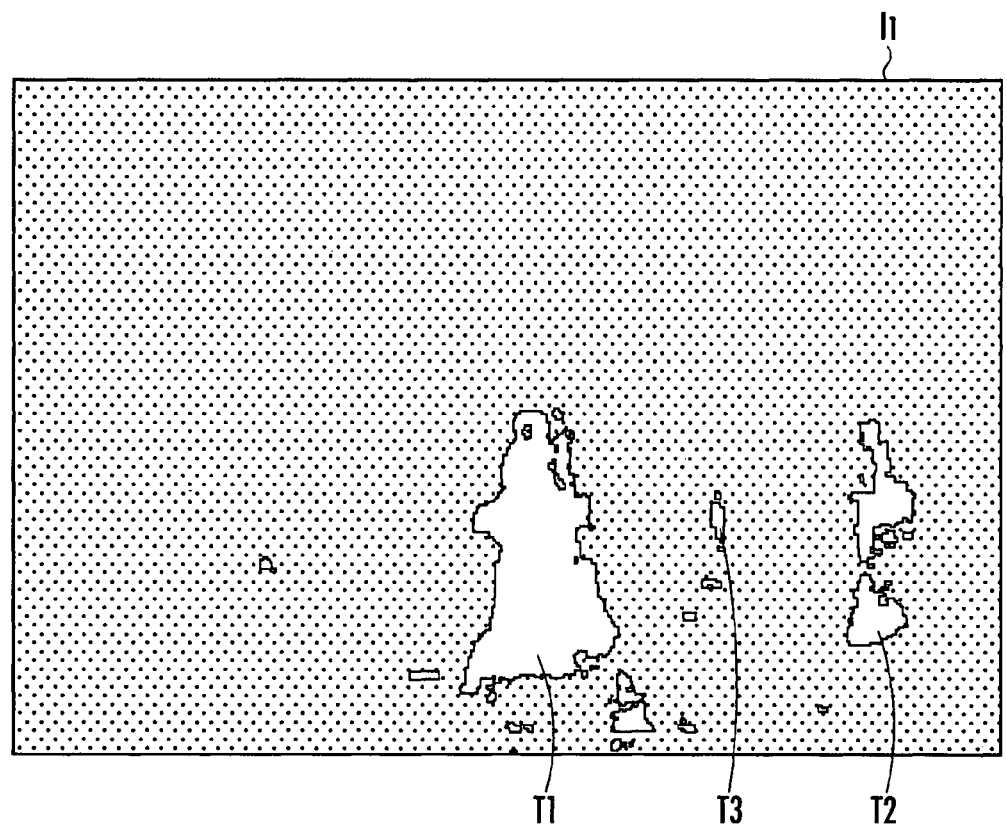
FIG. 4 is a diagram showing an example of images representing the results of detection of movable objects in the object detection processing shown in FIG. 2.

In STEP 8, the detection unit 8 detects movable objects by removing noise through certain processing such as clustering on the points determined as belonging to movable objects in STEP 7. As a result, movable objects T1 to T3 illustrated in FIG. 4 are thus detected.

Through the above-described processing, movable objects T1 to T3 can be detected with accuracy from the time series $I_t$, $I_{t+\Delta t}$ of images obtained through the camera 3.

In the above-described embodiment, the feature point extraction unit 5 extracts feature points by using Gabor filters and the correspondence degree computation unit 6 computes the degree of correspondence by using the feature value obtained by performing Gabor filtering on the extracted feature points. However, another embodiment is conceivable in which the feature point extraction unit 5 extracts feature points by using changes in colors on the image and the correspondence degree computation unit 6 computes the degree of correspondence using a feature value with respect to the extracted feature point colors.

What is claimed is:

1. An object detection apparatus which detects a movable object in a region around a vehicle from a time series of images including at least a first and second image obtained through a camera mounted on the vehicle, the apparatus comprising:
a feature point extraction unit which extracts a first set of feature point contained in a feature region of the first image and a second set of feature point contained in a feature region of the second image;
a correspondence degree computation unit which:
creates a combination set of pairs of feature points by pairing each feature point from the first set with each feature point of the second set,
computes a degree of correspondence for each pair of the feature points in the combination set, and
reduces the combination set to a corresponding pairs set that includes the pairs from the combination set having the highest computed degree of correspondence for each feature point of the first set; and
a detection unit which detects the movable object on the basis of the degree of correspondence computed by the correspondence degree computation unit.

2. The object detection apparatus according to claim 1, further comprising a movement estimation unit which estimates parameters indicating the state of movement of the camera on the basis of the degree of correspondence computed by the correspondence degree computation unit, wherein the detection unit detects the movable object on the basis of the parameters estimated by the movement estimation unit for indicating the state of movement, and a feature value of each of the corresponding pairs of the set of corresponding pairs.

3. The object detection apparatus according to claim 2, wherein the movement estimation unit estimates the parameters indicating the state of movement of the camera on the basis of the degree of correspondence for each of the corresponding pairs of the set of corresponding pairs satisfying an epipolar constraint condition.

4. The object detection apparatus according to claim 2, wherein the feature point extraction unit extracts the feature points by using a plurality of Gabor filters having different orientations and scales, and the correspondence degree computation unit computes the degree of correspondence by using a feature value obtained by performing filtering with the plurality of Gabor filters on the feature points extracted by the feature point extraction unit.

5. The object detection apparatus according to claim 2, wherein the feature point extraction unit extracts the feature points by using changes in colors on the images, and the correspondence degree computation unit computes the degree of correspondence by using a feature value relating to the colors of the feature points extracted by the feature point extraction unit.

6. An object detection method for detecting a movable object in a region around a vehicle from a time series of images including at least a first and second image obtained through a camera mounted on the vehicle, the method comprising:
a feature point extraction step of extracting a first set of feature points contained in a feature region of the first image and a second set of feature point contained in a feature region of the second image;
a correspondence degree computation step of:
creating a combination set of pairs of feature points by pairing each feature point from the first set with each feature point of the second set,
computing a degree of correspondence for each pair of feature points in the combination set, and
reducing the combination set to a corresponding pairs set that includes the pairs from the combination set having the highest computed degree of correspondence for each feature point of the first set; and
a detection step of detecting the movable object on the basis of the degree of correspondence computed in the correspondence degree computation step.

* * * * *